(12) United States Patent
Follestad et al.

(10) Patent No.: US 6,794,326 B1
(45) Date of Patent: *Sep. 21, 2004

(54) CATALYST SYSTEM FOR ETHYLENE POLYMERIZATIONS

(75) Inventors: Arild Follestad, Stathelle (NO); Klaus-Joachim Jens, Langesund (NO); Richard Blom, Oslo (NO); Ivar Martin Dahl, Oslo (NO)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/673,121

(22) PCT Filed: Apr. 7, 1999

(86) PCT No.: PCT/NO99/00116

§ 371 (c)(1),
(2), (4) Date: Nov. 27, 2000

(87) PCT Pub. No.: WO00/52951

PCT Pub. Date: Oct. 21, 1999

(30) Foreign Application Priority Data

Apr. 8, 1998 (NO) ................................................ 981631

(51) Int. Cl.[7] ........................... B01J 31/00; B01J 37/00; C08F 4/02; C08F 4/60
(52) U.S. Cl. ...................... 502/117; 502/113; 502/154
(58) Field of Search ................................ 502/117, 113, 502/154; 525/10, 15

(56) References Cited

U.S. PATENT DOCUMENTS 3,378,536 A    4/1968  Walker
6,013,595 A *  1/2000  Lhost et al. ................. 502/113
6,395,669 B1 * 5/2002  Sartain et al. ............... 502/125
6,541,581 B1 * 4/2003  Follestad et al. ............ 526/105

FOREIGN PATENT DOCUMENTS

| EP | 0 206 794 | 12/1986 | ............. C08F/4/76 |
| EP | 0 339 571 | 11/1989 | ............. C08F/4/60 |
| WO | WO 97/08213 | 3/1997 | |
| WO | WO 97/27225 | * 7/1997 | ............. C08F/4/78 |

* cited by examiner

Primary Examiner—Mark L. Bell
Assistant Examiner—Jennine Brown
(74) Attorney, Agent, or Firm—Testa, Hurwitz & Thibeault, LLP

(57) ABSTRACT

A catalyst system for the polymerization of ethylene, comprising a particulate inorganic oxide supporting a chromium oxide being in a reduced oxidation state and a metallocene compound having the formula $Cp_2ZrR'R''$, wherein each Cp, being equal or different, is an unsubstituted or substituted cyclopentadienyl compound, and R' and R', independent of each other, are selected from the group comprising alkyls having 1 to 6 carbon atoms, unsubstituted or substituted benzyl, and phenoxy substituted with alkyls having 1 to 6 carbon atoms; or R' or R" may be a halide. The catalyst system is prepared by a method comprising the steps of calcining the support, joining onto the surface of the support a chromium-organic compound, subjecting the obtained catalyst precursor to oxidizing conditions to obtain the chromium in an oxidized state, reducing the oxidized chromium to obtain a main part thereof in a bivalent oxidation state, and contacting the reduced catalyst with the metallocene compound.

13 Claims, No Drawings

CATALYST SYSTEM FOR ETHYLENE POLYMERIZATIONS

This application is the National Stage of International Application No. PCT/NO99/00116, filed on Apr. 7, 1999, which claims priority to Norwegian Application No. 981631, filed on Apr. 8, 1998.

TECHNICAL FIELD

The present invention relates to a supported chromium oxide catalyst, in particular a catalyst system comprising an inorganic support, a chromium oxide and a metallocene compound, and a method for the preparation of said catalyst system. The catalyst produces branched polyethylenes without the use of a copolymer, and the molecular weight can be controlled by feeding hydrogen.

BACKGROUND ART

To obtain linear polyolefins having desired properties, different catalyst systems in combinations with controlled polymerisation conditions are used. A typical supported chromium catalyst that is extensively used in commercial polymerisations of ethylene is formed by depositing a chromium compound onto a support, which is then oxidised. The oxidised catalyst precursor may be introduced as such into a polymerisation reactor, where it will be reduced in situ by the olefin monomers to its active catalytic state. It is also well known that oxidised chromium compounds may be prereduced by suitable reagents, such as hydrogen or carbon- monoxide (J. P. Hogan, J.Polym. Sci., PtA-1, 8, 2637 (1970), and references therein). The resulting chromium surface species are generally accepted to be highly reactive. A prereduced chromium-based catalyst will produce polyethylenes having a broad molecular weight distribution (MWD) and mainly long, straight chains. Such catalysts are not hydrogen-sensitive.

Another commercially important class of catalysts used to polymerise α-olefins are the cyclopentadienyl transition metal catalysts, usually termed metallocene catalysts. Metallocenes contacted with Lewis acids will give effective polymerisation catalysts that produce linear polyethylenes having a narrow molecular weight distribution (MWD). Such catalysts are sensitive to the presence of hydrogen.

By adding comonomers and optionally hydrogen during the catalysed polymerisation reactions the density and chain branching of the produced polymer can be controlled. In the prior art efforts have been made to develop combined catalyst system that produce short chain branched polyethylenes, without the addition of comonomers during the polymerisation reactions.

U.S. Pat. No. 4,735,931 discloses a catalyst system prepared by first depositing a chromium compound on a predominantly silica support, activating said catalyst in an oxygen-containing atmosphere and thereafter subjecting the thus activated composition to reduction with carbon monoxide. The resulting chromium catalyst composition is then precontacted with a cocatalyst selected from trialkyl boron and dialkyl aluminium alkoxide compounds, preferably triethyl borane, and thereafter contacted with ethylene. When used in olefin polymerisations this catalyst provides in situ generation of comonomers, resulting in tough, flexible, mainly pure polyethylene resins.

U.S. Pat. No. 5,032,651 teaches the use of catalyst mixtures of two transition metal catalysts. One of the catalysts comprises chromium oxide supported on an aluminophosphate, and the other one comprises a β-stabilized tetrahydrocarbyl zirconium compound supported on an inorganic material. The catalysts may be premixed before use, or they may be fed separately to the reactor. Olefinic polymers exhibiting high environmental stress crack resistance (ESCR) are produced.

EP 206794 describes an olefin polymerisation catalyst comprising a support contacted with a Group 4b, 5b or 6b metallocene and an aluminoxane.

EP 088 562 discloses a modified polymerisation catalyst comprising a silica support with deposited chromium. Following oxidation in dry air, the chromium is modified by being contacted with a transition metal compound of Ti, V or Cr, preferably Ti. Only the use of bis-toluene titanium is exemplified, and the obtained polyethylenes have a substantial degree of branching and a medium or broad molecular weight distribution.

U.S. Pat. No. 3,378,536 discloses a process for the polymerisation of ethylene by the use of a two-component catalyst system consisting of (a) a chromium compound deposited on e.g silica, where the chromium being activated in an oxygen-containing gas at a high temperature and then reduced with CO; and (b) chromium or vanadium arene where the arene is an aromatic, optionally substituted $C_6$ ring. The two catalyst components are preferably fed separately to the polymerisation reactor.

It is well known to a person skilled in the art that the various processing techniques used in the manufacturing of final articles from polyethylene resins require polyethylene grades having specific rheological properties. For instance, in the extrusion blow moulding of containers polyethylenes having a broad MWD and long straight chains are typically used, while in film blowing lower density polyethylenes are preferred.

It is an object of the present invention to provide a novel catalyst system that, produces a branched polyethylene from ethylene without any addition of comonomer during the polymerisation reaction. A further object is to control the polymerisation reaction to produce polyethylenes having a desired density and molecular weight. Another object is to obtain polyethylene resins suitable for use blow moulding and film blowing processing.

It has now been found that a catalyst system comprising a prereduced chromium on silica catalyst that have been contacted with a metallocene compound fulfils the requirements above. The novel catalyst system produces a branched low density polyethylene polymer without any added comonomer. The density and molecular weight (and hence the melt flow index) of the polymer can be controlled by the addition of hydrogen to the reactor.

DISCLOSURE OF INVENTION

The present invention thus provides a catalyst system for the polymerisation of ethylene, comprising chromium oxide supported on an inorganic support, wherein
a) said support being a particulate inorganic oxide;
b) the chromium of said chromium oxide being in a reduced oxidation state, and comprising
c) a metallocene compound having the formula:

wherein each Cp, being equal or different, is an unsubstituted or substituted cyclopentadienyl compound, and R' and R", independent of each other, are selected from the group comprising alkyls having 1 to 6 carbon atoms, unsubstituted or substituted benzyl, and phenoxy substituted with alkyls having 1 to 6 carbon atoms, and R' or R" may be a halide.

The invention also provides a method for the preparation of the catalyst system above, comprising the steps of:

a) calcining a support being a particulate, inorganic oxide selected from the group comprising alumina, silica, titania, zirconia, magnesia, and combinations thereof,
b) joining onto the surface of said support a chromium-organic compound to obtain a catalyst precursor,
c) subjecting said catalyst precursor to oxidising conditions to obtain the chromium in an oxidised state,
d) subjecting said catalyst precursor to reducing conditions to obtain a prereduced catalyst, thus
e) reducing the oxidised chromium to obtain the main part thereof in a bivalent oxidation state,
f) contacting said reduced catalyst with a metallocene compound having the formula:

$$Cp_2ZrR'R''$$

wherein each Cp, equal or different, is an unsubstituted or substituted cyclopentadienyl compound, and R' and R'', independant of each other, are selected from the group comprising alkyls having 1 to 6 carbon atoms, unsubstituted or substituted benzyl, and phenoxy substituted with alkyls having 1 to 6 carbon atoms, and R' or R'' may be a halide.

BEST MODES FOR CARRYING OUT THE INVENTION

The catalyst system of the present invention comprises a supported reduced chromium/silica catalyst contacted with a metallocene compound. In general, metallocenes based on zirconium, hafnium and titanium are preferred as metallocene catalysts. By metallocenes are meant compounds in which a metal atom or ion or complex ion is η-bonded by at least one ligand, e.g. by 1, 2 or 3 ligands or ligand components. The η-bonding ligands in such catalysts may be simple unsubstituted cyclopentadienyl rings, but preferably they will be optionally substituted fused ring systems (e.g. indenyl ligands), substituted cyclopentadienyl rings, optionally substituted bridged bis-cyclopentadienyl ligands or optionally substituted bridged bis fused ring systems (e.g. bis indenyl ligands).

The catalyst support may be any oxide of metals from groups 2, 3, 4, 11, 12, 13 and 14 of the Periodic System of Elements. Preferred metal oxides are magnesia, alumina, titania, zirconia and silica. A particularly preferred catalyst support is silica. Such a silica support must contain not less than 90% pure silica, with the remaining part may consisting of other oxides, such as oxides of aluminium, zirconium, titanium, magnesium and phosphor. The support should consist of particles having preferably a spherical or spheroidal shape and a size from about 10 μm to 150 μm, more preferably from 20 μm to 120 μm, and a particle size distribution from narrow to broad within said ranges.

The chromium compound to be impregnated onto the silica support may be an inorganic chromium compound, such as chromium nitrate and chromium oxide, or an organic chromium compound, such as chromium acetate. Other chromium compounds are also useable. The chromium compound can be Joined with the support in any way known in the art, such as by coprecipitation with the silica support or addition to a silica gel after its formation, or after that it has been dried. A typical procedure of impregnation comprises the use of a water-soluble compound, or the use of an organochromium compound in an anhydrous hydrocarbon solution. The only precondition is that the chromium compound can be oxidized to a chromium oxide. The amount of chromium compound joined with the inorganic support must be sufficient to obtain from 0.1% to 10%, preferably from 0.5% to 2.0%, by weight of chromium, calculated as metallic chromium based on the weight of the supported chromium catalyst. When the impregnation is finished any possible remaining solvent is removed to obtain a dry solid.

Such solid chromium oxide/silica catalyst precursors are also commercially available from a number of producers. A closer description of their preparation is therefore regarded as being superfluous.

The obtained catalyst precursor must be activated before use. This is done by calcination in dry air or another oxygencontaining gas at temperatures in the range from 400 to 950° C., preferably from 550 to 800° C., during a period from 10 minutes to 24 hours, preferably from 2 to 20 hours. The oxidised catalyst precursor is conventionally subjected to reduction, preferably with carbon monoxide or a mixture of carbon monoxide and an inert component, such as nitrogen or argon. The reduction is normally performed at a temperature within the range from 300 to 500° C., preferably from 350° C. to 400° C., during a period from 5 minutes to 48 hours, preferably from 1 to 10 hours. When the reduction is completed, the major part of the contained chromium should preferably be in a bivalent oxidation state. The final chromium catalyst particles should have a surface area from 200 to 600 $m^2/g$, more preferably from 300 to 550 $m^2/g$, and a pore volume from 1 to 3 $cm^3/g$. The chromium oxide/silica catalyst in a reduced state, either as a dry powder or as a slurry in a dry oxygen-free hydrocarbon solvent, e.g. an alkane, must be stored in an inert ambience.

The present invention is not restricted to any particular procedure for the preparation of the chromium oxide/silica catalyst, and other methods than those described here may also be applicable.

The obtained chromium oxide/silica catalyst is contacted with a cyclopentadienyl-zirconium compound, hereinafter termed "zirconocene". Preferred zirconocenes can be represented by the simplified formula:

$$Cp_2ZrR'R''$$

wherein Cp designates cyclopentadienyl groups selected from unsubstituted cyclopentadienyl; cyclopentadienyl substituted with radicals selected from the group comprising unsubstituted and substituted linear, branched, cyclic or partially cyclic alkyl radicals, and annelated cyclic radicals, containing 1 to 20 carbon atoms; unsubstituted and substituted monocyclic or polycyclic aryl radicals which optionally also may contain hetero atoms; and aralkyl radicals. The substituents on the cyclopentadienyl ring may also form annelated structures comprising one or more fused benzene, naphtalene or cyclohexene rings, which optionally may contain hetero atoms. The substituents R' and R'', equal or different, are selected from the group comprising alkyls having 1 to 6 carbon atoms, unsubstituted or substituted benzyl, and phenoxy substituted with alkyls having 1 to 6 carbon atoms. Preferably, R' and R'' are independently selected from the group comprising methyl, benzyl or fenoxymethyl, and any combination thereof. One or R' and R'' may also be a halide, preferably chloride.

A number of suitable metallocene compounds of the formula above are known in the art and have been recited in the literature. Particularly preferred metallocene compounds are embodied in the working examples.

Particularly good results are obtained when Cp represents cyclopentadienyl, and R' and R'' are the same and are benzyl or methyl.

The zirconocene compound is joined with the activated prereduced chromium oxide/silica catalyst most conveniently by dissolving the zirconocene in a solvent, e.g. toluene, and impregnate the chromium oxide/silica catalyst with this toluene solution. Eventually, the solvent is removed by evaporation, preferably in an inert atmosphere, whereupon the catalyst is ready for use.

The final catalyst will contain both zirconium and chromium, preferably in a molar ratio of zirconium to chromium in the range from O.1:1 to not higher than 2:1. More preferably the catalyst contains zirconium and chromium in a molar ratio from 0.5:1 to 1:1.

Prior to polymerisation, the catalyst may optionally be prepolymerised with a minor amount of ethylene and/or an α-olefin in accordance with methods well known in the art, before being fed continuously to the polymerisation reactor. Polymerisations can be performed in any conventional type of reactor, such as in a batch reactor or most preferably in a continuous reactor. The present catalysts are suitable for use in all types of olefin polymerisations, including gas phase and suspension polymerisations. In general, polymerisations are performed at temperatures below 110° C., and at a total pressure in the range from ambient to 50 bar. Hydrogen is used to control the molecular weight, and consequently the melt flow index, of the polymer., whereas the catalyst determines the short chain branching on the polyethylene backbone and hence the density of the polyethylene.

The general polymerisation parameters mentioned above are well known in the art and further details concerning ethylene polymerisations should be superfluous. Typical polymerisation conditions are presented in the examples below.

It is realized that the present catalyst system has its highest catalytic activity when the substituents R' and R" of the zirconocene compound are pure hydrocarbyl radicals, in the examples embodied as benzyl or methyl. A person skilled in the art will understand that similar hydrocarbyl compounds are expected to have the same effect and that such compounds are contemplated by the present invention. The catalysts of this invention provide substantially higher activities than the prior art chromium/silica catalysts. When the substituents R' and R" contain hetero atoms, such as 0 and Cl, the present catalysts will get a reduced activity, typically lower than the activity of a comparative prior art chromium/silica catalyst. Thus, the activities of the catalysts of the present invention will be at their highest when the metallocene component is a pure hydrocarbyl zirconocene.

The present catalysts will have an activity that varies with the molar ratio between zirconium and chromium in the final catalyst. When the contained amount of zirconium is higher than the amount of chromium, the catalyst will have a lower catalytic activity than a comparative prior art chromium/silica catalyst. The present catalysts have their highest activity when the molar ratio between zirconium and chromium is about 0.5:1. This Indicates that only a minor amount of zirconocene is required to increase substantially the activity of a chromium/silica catalyst.

The catalytic activities of the present catalysts are also influenced by the concentration of hydrogen present in the polymerisation reactor. It has been found that an optimum level is about 1 bar of hydrogen.

The hydrogen level will also influence on the short chain branching of the produced polyethylenes. Analysis of polyethylenes polymerised with the present catalysts show that the obtained polymers have a higher amount of short chain branching than polyethylenes produced with a prior art chromium/silica catalyst. In particular, the amount of ethyl branches will increase. A higher level of hydrogen will increase the amount of short chain branching, in particular when using a catalyst having a ratio Zr/Cr of 0.5. By adjusting this ratio, as well as the hydrogen level inside the reactor, the morphology of the final resin can be controlled. Compared with the common used prior art chromium/silica catalysts, the catalysts of the present invention have a higher activity and will give a higher amount of short chain branching.

The present catalysts are preferably used to homopolymerise ethylene. However, it is also possible to use the present catalysts in copolymerisations of ethylene with a comonomer or a mixture of comonomers. Useful comonomers are all polymerisable α-olefins having the general formula $CH_2=CHR$, wherein R is a hydrocarbon radical containing 1–18 carbon atoms, preferably 1–10 carbon atoms. Examples of particularly preferred α-olefins are propylene, 1-butene, 1-hexene, 4-methyl-l-pentene and 1-octene. However, the greatest achievements of the present catalysts are in homopolymerisations of ethylene.

The produced polyethylenes will have a density from 910 to >960 kg/m$^3$, and a melt index from 0.01 to above 100 g/10 min, preferably from 0.1 to 60 g/l0 min (determined according to the method of ASTM 1238), depending on the polymerisation conditions, as explained above. More detailed specifications concerning the properties of the obtained polyethylenes are given in the examples.

EXAMPLES

Preparation of a Cr/SiO$_2$ Catalyst

A catalyst support of silica having a surface area of 300 m$^2$/g and a pore volume of 1.6 cm$^3$/g was impregnated with an aqueous solution of CrO$_3$ in an amount sufficient to finally obtain 1% by weigt of Cr, calculated as metal based on the weight of the support. The impregnated support was reduced at 380 ° C. in a gas consisting of 5% of CO in nitrogen for 4 h, and then allowed to cool to ambient temperature in an inert atmosphere. For further use, the obtained blue-coloured catalyst was suspended in a dry, oxygen-free, purified mineral oil to a level of about 10% by weight of-catalyst.

Synthesis of bis-cyclopentadienyl-zirconiumbenzyl (Cp$_2$ZrBz$_2$).

This zirconocene was prepared according to the method described by Fachinetti et al. in J. Chem. Soc., Chem. Commun., 1972, p. 654, by reacting 3 g of Cp$_2$zrCl$_2$ with 20.6 ml of a 1.0 M solution of BzMgCl (Bz=benzyl) in toluene at 0° C. for 1.5 h. The obtained yellow product was recrystallized from a mixture of toluene/heptane at −25° C. The crystallized solid was collected by filtration and dried in vacuum.

Synthesis of bis-cyclopentadienyl-zirconiummethyl (Cp$_2$ZrMe$_2$)

This zirconocene was synthesized according to the method described by Wailes et al. in J. Organomet. Chem., Vol. 34, 1972, p. 155, by reacting 5 g of Cp$_2$ZrCl$_2$ with 21.6 ml of MeLi (Me=methyl) in diethylether at 0 ° C. for 1 h. The precipitated LiCl was removed by filtration and the diethylether evaporated in vacuum to obtain a solid residue. This residue was heated at 80° C. and reduced pressure (2 to 10 torr). The obtained sublimed white crystalline Cp$_2$ZrMe$_2$ was collected.

Synthesis of bis-cyclopentadienyl-zirconiummethyl (fenoxymethyl) (Cp$_2$ZrMe (OPhMe)

To 4.84 ml of a 10% toluene solution of Cp$_2$ZrMe$_2$ was added a stoichiometric amount of a 2.1% toluene solution of cresol at ambient temperature and allowed to react for 1 h. Methane was released during the reaction.

Synthesis of bis-cyclopentadienyl-zirconiummethylchloride (Cp$_2$ZrMe(Cl))

To 10 g of a 5% solution of Cp$_2$ZrMe$_2$ was added slowly 48.7 ml gaseous HCl at 0° C. The mixture was then allowed to reach ambient temperature and it was kept at this temperature overnight to complete the reaction.

General Procedure for the Preparation of Zirconocene-containing Catalysts

A synthesized zirconocene compound was contacted with the Cr/SiO$_2$ catalyst above. In an inert atmosphere at ambient temperature the zirconocene was added dropwise to a 10% slurry of the Cr/SiO$_2$ catalyst and the reaction mixture stirred for at least 1 h to complete the reaction.

General Polymerisation Procedure

A 1 l laboratory stainless steel batch reactor equipped with a paddle stirrer was heated to a desired temperature between 90° C. and 100° C. and purged with nitrogen, then 1.5 ml of the catalyst slurry was introduced and a desired amount of hydrogen was fed to the reactor. Then 0.5 l of i-butane was added to act as a diluent, whereupon ethylene was introduced until a total pressure of 31.0 bar. The overall pressure was kept constant during the entire polymerisation run by feeding ethylene. The reactor temperature was kept constant at the fixed temperature to an accuracy of ±0.5° C. by automatically adjusting the heating and/or cooling of the reactor. Polymerisation times were from 20 and 40 minutes.

Examples 1 to 8

These examples demonstrate the polymerisation of ethylene in the presence of a catalyst containing one of the various zirconocene compounds synthesised above. The examples show that the catalysts comprising Cr/SiO$_2$ contacted with Cp$_2$ZrBz$_2$ or Cp$_2$ZrMe$_2$ have the highest polymerisation activities. In all examples the molar ratio Zr/Cr equalled 1, the polymerisation temperature was in the range from 93° C. to 98° C., and the H$_2$ pressure was either 1.0 or 0.5 bar. Polymerisation parameters and obtained results are given in table 1.

Examples 1 and 2

Polymerisation catalyst: Cr/SiO$_2$ contacted with Cp$_2$ZrBz$_2$. In a 20 ml vial 0.510 g of the prepared Cr/SiO$_2$ catalyst (containing 1% Cr) was suspended in 4.168 g of mineral oil and the bottle closed with a septum. By the use of a syringe 0.375 of a 10% toluene solution of Cp$_2$ZrBz$_2$ was added while stirring by the use of a magnet bar, and the stirring continued for 1 h more. The obtained catalyst was used in the polymerisation of ethylene according to the general polymerisation procedure described above.

Examples 3 and 4

Polymerisation catalyst: Cr/SiO$_2$ contacted with Cp$_2$ZrMe$_2$. The procedure of Examples 1 and 2 was followed, except that the catalyst was prepared by adding 0.251 ml of a 10% solution of Cp$_2$ZrMe$_2$.

Examples 5 and 6

Polymerisation catalyst: Cr/SiO$_2$ contacted with Cp$_2$ZrMe(OPhMe). The procedure of examples 1 and 2 was followed, except that the catalyst was prepared by adding 0.342 ml of a 10% solution of Cp$_2$ZrMe(OPhMe).

Examples 7 and 8

Polymerisation catalyst: Cr/SiO$_2$ contacted with Cp$_2$ZrMe(Cl). The procedure of examples 1 and 2 was followed, except that the catalyst was prepared by adding 0.342 ml of a 5% solution of Cp$_2$ZrMe(OPhMe).

Example 9 (Comparative Example)

Polymerisation catalyst: Cr/SiO$_2$.

The procedure of examples 1 and 2 was followed, except that the catalyst was prepared by suspending 2 g of the Cr/SiO$_2$ prepared above in 16.691 g of mineral oil in a 50 ml glass bottle which was sealed with a septum. An amount of 1.5 ml of the catalyst slurry was withdrawn and used in a polymerisation run.

The results presented in Table 1 show that the pure hydrocarbyl zirconocenes of Examples 1 and 2, Cp$_2$ZrBz$_2$, and 3 and 4, Cp$_2$ZrMe$_2$, gave increased polymerisation activities compared with the standard prior art Cr/Si catalyst. On the other hand, the catalysts of Examples 5 and 6 containing hydrocarboxy substituents, and of Examples 7 and 8 containing chloride substituents, have lower activities than the prior art catalyst of Example 9. Further, the results show that the catalytic activity of the catalyst of Examples 1 and 2 depends on the hydrogen level present during polymerisation, and also properties like MFR and density of the produced polyethylene vary with the hydrogen concentration. Thus, the properties of the produced polyethylene can be controlled by regulating the hydrogen feed to the polymerisation reactor. The catalyst of Examples 3 and 4 shows the same tendency, but less pronounced. The activities of the catalysts of Examples 5 and 6, and 7 and 8, show a much less response to the presence of hydrogen.

TABLE 1

Polymerisation of ethylene in the presence of catalyst Cr/silica + Cp$_2$ZrR'R"

| Ex. | R' | R" | Zr/Cr | H$_2$ (bar) | Temp. (° C.) | Activity g/g · h | MFR g/10 min | Density g/cm$^3$ |
|---|---|---|---|---|---|---|---|---|
| Ex. 1 | Bz | Bz | 1 | 0.5 | 93 | 1054 | 0.09 | 0.933 |
| Ex. 2 | Bz | Bz | 1 | 1.0 | 98 | 788 | 0.35 | 0.945 |
| Ex. 3 | Me | Me | 1 | 0.5 | 93 | 1005 | 0.006 | 0.946 |
| Ex. 4 | Me | Me | 1 | 1.0 | 94 | 849 | 0.017 | 0.947 |
| Ex. 5 | Me | OPhMe | 1 | 0.5 | 93 | 338 | 0.004 | 0.952 |
| Ex. 6 | Me | OPhMe | 1 | 1.0 | 97 | 341 | 0.03 | 0.952 |
| Ex. 7 | Me | Cl | 1 | 0.5 | 93 | 383 | 0.01 | 0.950 |
| Ex. 8 | Me | Cl | 1 | 1.0 | 97 | 392 | 0.05 | 0.047 |
| Comp. 9 | — | — | — | 1.0 | 97 | 617 | 0.09 | 0.949 |

Examples 10 to 16

These examples demonstrate the relation between catalytic activity and the ratio Zr/Cr of the catalyst in the polymerisations of ethylene. The catalyst of Examples 1 and 2, $Cp_2ZrEz_2$, and of Examples 3 and 4, $Cp_2ZrMe_2$, were used. The general polymerisation procedure above was followed.

Example 10

Polymerisation catalyst: $Cr/SiO_2$ contacted with $Cp_2ZrBz_2$, having a Zr/Cr molar ratio of 0.25:1.

The catalyst was prepared analogous to example 1 by suspending 1.750 g of prereduced 1% by weight $Cr/SiO_2$ in 14.685 g of mineral oil in a 50 ml glass bottle provided with a septum. To this mixture was added 0.352 ml of 10% by weight $Cp_2ZrBz_2$ in toluene, and the mixture was stirred for another 1 h. The obtained catalyst was then used in the polymerisation of ethylene.

Example 11

The polymerisation catalyst was prepared as in Example 10, except that 0.5 g of $Cr/SiO_2$ was suspended in 4.801 g of mineral oil in a 20 ml glass bottle, and 0.201 ml of a 10% by weight solution of $Cp_2ZrBz_2$ in toluene was added to obtain a Zr/Cr ratio of 0.5:1.

Example 12

The catalyst was prepared as in Example 11, except that 0.403 ml of a 10% by weight solution of $Cp_2ZrBz_2$ in toluene was added to obtain a Zr/Cr molar ratio of 1:1.

Example 13

The catalyst was prepared as in Example 11, except that 0.806 ml of a 10% by weight solution of $Cp_2ZrBz_2$ in toluene was added to obtain a Zr/Cr molar ratio of 2:1.

Example 14

Polymerisation catalyst: $Cr/SiO_2$ contacted with $Cp_2ZrMe_2$, having a Zr/Cr molar ratio of 0.5:1.

The catalyst was prepared analogous to example 3 by suspending 1 g of $Cr/SiO_2$ in 8.327 g of mineral oil in a 50 ml glass bottle provided with a septum. To this mixture was added 0.251 ml of a 10% by weight solution of $Cp_2ZrMe_2$ in toluene, and the mixture was stirred for another 1 h.

Examples 15 and 16

The catalyst was prepared as in Example 14, except using 0.502 ml and 1.004 ml of the 10% by weight solution of $Cp_2ZrMe_2$ in toluene, respectively. The Zr/Cr ratios were 1:1 and 2:1, respectively.

The results presented in Table 2 show that the catalyst $Cp_2ZrBz_2$ of Examples 10 to 13 has a highest activity with a Zr/Cr molar ratio of about 0.5:1. When this ratio is increased, the catalyst activity decreases and becomes zero at a ratio of 2:1. The catalyst $Cp_2ZrMe_2$ shows a decreasing activity with increasing ratio Zr/Cr from 0.5:1 to 2:1. Thus, for both catalysts an optimal ratio seems to be Zr/Cr=0.5:1.

TABLE 2

Polymerisation of ethylene in the presence of catalyst Cr/silica + $Cp_2ZrR_2$ with various Zr/Cr molar ratios

| Ex. | R, R" | Zr/Cr | $H_2$ (bar) | Temp. (° C.) | Activity g/g · h | MFR g/10 min | HLMFR g/10 min |
|---|---|---|---|---|---|---|---|
| Ex. 10 | Bz | 0.25 | 2 | 93 | 1115 | 0.087 | 16 |
| Ex. 11 | Bz | 0.5 | 0.5 | 94 | 1656 | 0.088 | 13.75 |
| Ex. 12 | Bz | 1 | 0.5 | 93.5 | 1282 | 0.034 | 7.93 |
| Ex. 13 | Bz | 2 | 1 | 95.3 | 0 | — | — |
| Ex. 14 | Me | 0.5 | 0.5 | 4 | 1174 | 0.029 | 6.02 |
| Ex. 15 | Me | 1 | 0.5 | 94 | 970 | 0.014 | 4.06 |
| Ex. 16 | Me | 2 | 0.5 | 93.6 | 525 | 0.021 | 4.63 |
| Comp. 9 | — | — | 1 | 97 | 617 | 0.091 | 14.5 |

Examples 17 to 22

These examples demonstrate the effect of varying the partial pressure of hydrogen in the reactor when polymerising ethylene in the presence of catalysts $Cp_2ZrBz_2$ and $Cp_2ZrMe_2$. In all examples the molar ratio Zr/Cr equalled 0.5:1. Polymerisation parameters and obtained results are given in Table 3.

Examples 17 to 20

Polymerisation catalyst: $Cr/SiO_2$ contacted with $Cp_2ZrBZ_2$. The catalyst was prepared analogous to example 11 by suspending 1.501 g of reduced 1% by weight of $Cr/SiO_2$ in 12.473 g of mineral oil in a 50 ml glass bottle provided with a septum. To this mixture was added 0.603 ml of a 10% by weight solution of $Cp_2ZrBz_2$ in toluene and the mixture was stirred for another 1 h. The obtained catalyst was then used in the polymerisation of ethylene according to the general polymerisation procedure outlined above, with hydrogen pressures of 0, 0.5, 1 and 2 bars, respectively.

Examples 21 and 22

Example 14 was repeated, except that the hydrogen pressure was 1 bar and 2 bars, respectively.

The results presented in Table 3 show that catalyst $Cp_2ZrBz_2$ and catalyst $Cp_2ZrMe_2$ behave differently in the presence of hydrogen. Catalyst $Cp_2ZrBz_2$ used in Examples 17 to 21 has a higher activity around 1 bar hydrogen pressure. Increased hydrogen level increases the melt index and lowers the density of the produced polyethylene, which indicates an increasing amount of short chain branching. Catalyst $Cp_2ZrMe_2$ used in Examples 14, 21 and 22 responds very little to an increased hydrogen pressure.

TABLE 3

Polymerisation of ethylene in the presence of catalyst
Cr/silica + Cp$_2$ZrR$_2$ (Zr/Cr molar ratio 0.5) at increasing H$_2$ levels

| Ex. | R, R" | H$_2$ (bar) | Temp. (° C.) | Activity g/g · h | MFR g/10 in | HLMFR g/10 min | Density g/cm$^3$ |
|---|---|---|---|---|---|---|---|
| Ex. 17 | Bz | 0 | 92.8 | 923 | 0.06 | 8.9 | 0.937 |
| Ex. 18 | Bz | 0.5 | 93 | 1290 | 0.15 | 19.8 | 0.937 |
| Ex. 19 | Bz | 1 | 93.2 | 1413 | 0.2 | 28.2 | 0.934 |
| Ex. 20 | Bz | 2 | 93 | 1057 | 1.07 | 87.6 | 0.928 |
| Ex. 14 | Me | 0.5 | 94 | 1174 | 0.029 | 6.02 | 0.948 |
| Ex. 21 | Me | 1 | 94 | 1190 | 0.021 | 5.89 | 0.948 |
| Ex. 22 | Me | 2 | 94 | 948 | 0.034 | 8.93 | 0.946 |
| Ex. 9 | | 1 | 97 | 617 | 0.091 | 14.5 | 0.949 |

Example 23

Example 11 was repeated, except that the level of hydrogen was increased to 1 bar.

Example 24

Example 12 was repeated, except that the level of hydrogen was increased to 1 bar.

Polyethylenes produced with catalyst Cr/SiO$_2$+Cp$_2$ZrBz$_2$ were subjected to spectroscopic analysis of end groups with IR and $^{13}$C-NMR. The spectroscopis analysis shows that the branches are mainly ethyl and butyl branches which have been introduced by the copolymerisation of 1-butene and 1-hexene as comonomers produced from ethylene simultaneously with the polymerisation reaction in the reactor. Obtained results are presented in Table 4.

The results of Table 4 show that there is produced a considerable amount of short chain branching on the polyethylenes during polymerisation. The short chain branching can be controlled by using catalysts with different Zr/Cr ratios and by adjusting the hydrogen level.

TABLE 4

Polymerization of ethylene in the presence of catalyst Cr/SiO$_2$ + Cp$_2$ZrBz$_2$

| Ex. | Zr/Cr mol/mol | H$_2$ (bar) | Temp. (° C.) | MI g/10 min | Density g/10 min | Methyl[1] pr. 1000 C | Vinyl[1] pr. 1000 C | Trans[1)2] pr. 1000 C | Ethyl[3] pr. 1000 C | Butyl[3] pr. 1000 C |
|---|---|---|---|---|---|---|---|---|---|---|
| Ex. 11 | 0.5 | 0.5 | 94 | 0.09 | 0.945 | 4.2 | 0.89 | 0.016 | 2.0 | 1.7 |
| Ex. 23 | 0.5 | 1 | 97 | 0.82 | 0.935 | 8.3 | 0.91 | 0.021 | 4.0 | 4.6 |
| Ex. 12 | 1 | 0.5 | 93.5 | 0.03 | 0.94 | 3.7 | 0.81 | 0.02 | 2.4 | 1.8 |
| Ex. 24 | 1 | 1 | 97 | 0.35 | 0.945 | 5.5 | 0.95 | 0.028 | 1.8 | 2.0 |
| Comp. 9 | | 1 | 97 | 0.09 | 0.949 | 1.3 | 0.87 | 0.002 | 0.3 | 0.3 |

[1]From IR measurements
[2]Transvinylene fragments
[3]From $^{13}$C-NMR measurements

What is claimed is:

1. A catalyst system for polymerisation of ethylene, said catalyst system comprising chromium oxide and a metallocene compound supported on a particulate, inorganic oxide support;

wherein at least 50% of the chromium of said chromium oxide is in a bivalent oxidation state, and wherein said metallocene compound has the formula:

   Cp$_2$ZrR'R"

wherein each Cp, being equal or different, is an unsubstituted or substituted cyclopentadienyl compound, and R' and R", independent of each other, are selected from the group consisting of alkyls having 1 to 6 carbon atoms, unsubstituted or substituted benzyl, and phenoxy substituted with alkyls having 1 to 6 carbon atoms, and R' or R" may be a halide, and wherein said catalyst system produced by a process wherein reduction of chromium is performed at a temperature within the range from 300° C. to 500° C.

2. A catalyst system according to claim 1, characterized in that the cyclopentadienyl compound is substituted with radicals selected from the group consisting of unsubstituted and substituted linear, branched, cyclic or partially cyclic alkyl radicals and annelated cyclic radicals, containing 1 to 20 carbon atoms; unsubstituted and substituted monocyclic or polycyclic aryl radicals which optionally also may contain hetero atoms; and aralkyl radicals; wherein substituents on the cyclopentadienyl ring may also form annelated structures comprising one or more fused benzene, naphtalene or cyclohexene rings, which optionally may contain hetero atoms, and the two cyclopentadienyl rings may also be connected through a bridge.

3. A catalyst system according to claim 1, characterized in that R' and R" are selected from the group consisting of chloride, methyl, benzyl or phenoxymethyl, and combinations thereof.

4. A catalyst system according to claim 1, characterized in that Cp is an unsubstituted cyclopentadienyl and that R' and R" are equal and are either methyl or benzyl.

5. A catalyst system according to claim 1, characterized in that said particulate, inorganic oxide support is selected from the group consisting of alumina, silica, titania, zirconia, magnesia, and combinations thereof.

6. A catalyst system according to claim 5, characterized in that said particulate, inorganic oxide support is silica having a shape of spherical or spheroidal particles with a particle size in a range of from 20 μm to 150 μm, and a surface area from 200 m²/g to 600 m²/g.

7. A catalyst system according to claim 1, characterized in that the chromium is present in an amount from 0.1% to 10% by weight calculated as metallic chromium based on weight of the chromium/particulate, inorganic oxide catalyst.

8. A catalyst system according to claim 7, characterized in that the chromium is present in an amount from 0.5 to 2.0% by weight calculated as metallic chromium based on weight of the chromium/particulate, inorganic oxide catalyst.

9. A catalyst system according to claim 1, characterized in that said molar ratio between zirconium and chromium is from 0.5:1 to 1:1.

10. A catalyst system according to claim 1, characterized in that the reduction of chromium is effected using a reducing agent comprising carbon monoxide.

11. A catalyst system for polymerisation of ethylene, said catalyst system comprising chromium oxide and a metallocene compound supported on a particulate, inorganic oxide support;

wherein at least 50% of the chromium of said chromium oxide is in a bivalent oxidation state, and said metallocene compound is bis-cyclopentadienylzirconium dibenzyl.

12. A method for the preparation of a catalyst system for polymerisation of ethylene, said catalyst system comprising chromium oxide and a metallocene supported on an inorganic support, the method comprising the steps of:

a) calcining a support comprising a particulate, inorganic oxide selected from the group consisting of alumina, silica, titania, zirconia, magnesia, and combinations thereof;

b) joining onto a surface of said support a chromium-organic compound to obtain a catalyst precursor;

c) subjecting said catalyst precursor to oxidising conditions to obtain chromium in an oxidised state;

d) subjecting said catalyst precursor to reducing conditions at a temperature within the range from 300° C. to 500° C. to obtain a reduced catalyst, wherein at least 50% of the chromium is in a bivalent oxidation state; and e) contacting said reduced catalyst with a metallocene compound having a formula:

$$Cp_2ZrR'R''$$

wherein each Cp, equal or different, is an unsubstituted or substituted cyclopentadienyl compound, and R' and R", independent of each other, are selected from the group consisting of alkyls having 1 to 6 carbon atoms, unsubstituted or substituted benzyl, and phenoxy substituted with alkyls having 1 to 6 carbon atoms, and R' or R" may be a halide.

13. A method according to claim 12, characterized in that subjecting said catalyst precuror to reducing conditions uses a reducing agent comprising carbon monoxide.

* * * * *